United States Patent
Kanai et al.

(10) Patent No.: US 9,308,478 B2
(45) Date of Patent: Apr. 12, 2016

(54) METHOD FOR HYDROPHILIZING HOLLOW-FIBER MEMBRANE MODULE

(71) Applicant: TORAY INDUSTRIES, INC., Tokyo (JP)

(72) Inventors: Hiroaki Kanai, Otsu (JP); Michitaka Higaki, Otsu (JP)

(73) Assignee: Toray Industries, Inc., Tokyo (JP)

( * ) Notice: Subject to any disclaimer, the term of this patent is extended or adjusted under 35 U.S.C. 154(b) by 193 days.

(21) Appl. No.: 14/347,853

(22) PCT Filed: Sep. 28, 2012

(86) PCT No.: PCT/JP2012/075140
§ 371 (c)(1),
(2) Date: Mar. 27, 2014

(87) PCT Pub. No.: WO2013/047775
PCT Pub. Date: Apr. 4, 2013

(65) Prior Publication Data
US 2014/0242276 A1    Aug. 28, 2014

(30) Foreign Application Priority Data
Sep. 28, 2011 (JP) .................. 2011-212113

(51) Int. Cl.
*B01D 39/16* (2006.01)
*B01D 63/02* (2006.01)
*B01D 67/00* (2006.01)
*B01D 69/02* (2006.01)

(52) U.S. Cl.
CPC ............ *B01D 39/1607* (2013.01); *B01D 63/02* (2013.01); *B01D 63/021* (2013.01); *B01D 63/022* (2013.01); *B01D 67/0088* (2013.01); *B01D 69/02* (2013.01); *B01D 2313/23* (2013.01); *B01D 2323/02* (2013.01)

(58) Field of Classification Search
CPC .............. B01D 39/1607; B01D 63/02–63/021; B01D 67/0088; B01D 2315/20; B01D 2325/36
See application file for complete search history.

(56) References Cited

U.S. PATENT DOCUMENTS

2011/0210067 A1* 9/2011 Kato .................... B01D 61/147
                                                                  210/634

FOREIGN PATENT DOCUMENTS

| JP | 05-031336 | 2/1993 |
|----|-----------|--------|
| JP | 5-31337 A | 2/1993 |
| JP | 5-269354 A | 10/1993 |
| JP | 10-314559 A | 12/1998 |
| JP | 2000-342932 A | 12/2000 |
| JP | 2005-262006 A | 9/2005 |
| JP | 2011-16116 A | 1/2011 |

OTHER PUBLICATIONS

International Search Report for International Application No. PCT/JP2012/075140 dated Nov. 6, 2012.

* cited by examiner

*Primary Examiner* — Alex A Rolland
(74) *Attorney, Agent, or Firm* — Ratnerprestia

(57) ABSTRACT

The present invention provides a method for hydrophilizing an external-pressure type hollow fiber membrane module, which is capable of efficiently hydrophilizing the hollow fiber membranes even in the vicinity of the bonded/fixed portion in the lower part of the casing. According to the hydrophilization method of the invention, the outer surfaces of the hollow fiber membranes in the lower part of the casing are prevented from receiving a water head pressure corresponding to the height of the membrane module and the hollow fiber membranes located in the vicinity of the lower bonded/fixed portion can be efficiently hydrophilized.

8 Claims, 5 Drawing Sheets

OUTER SURFACE OF HOLLOW FIBER MEMBRANE → HOLLOW PORTION

HOLLOW PORTION → OUTER SURFACE OF HOLLOW FIBER MEMBRANE

OUTER SURFACE OF HOLLOW FIBER MEMBRANE → HOLLOW PORTION

HOLLOW PORTION → OUTER SURFACE OF HOLLOW FIBER MEMBRANE

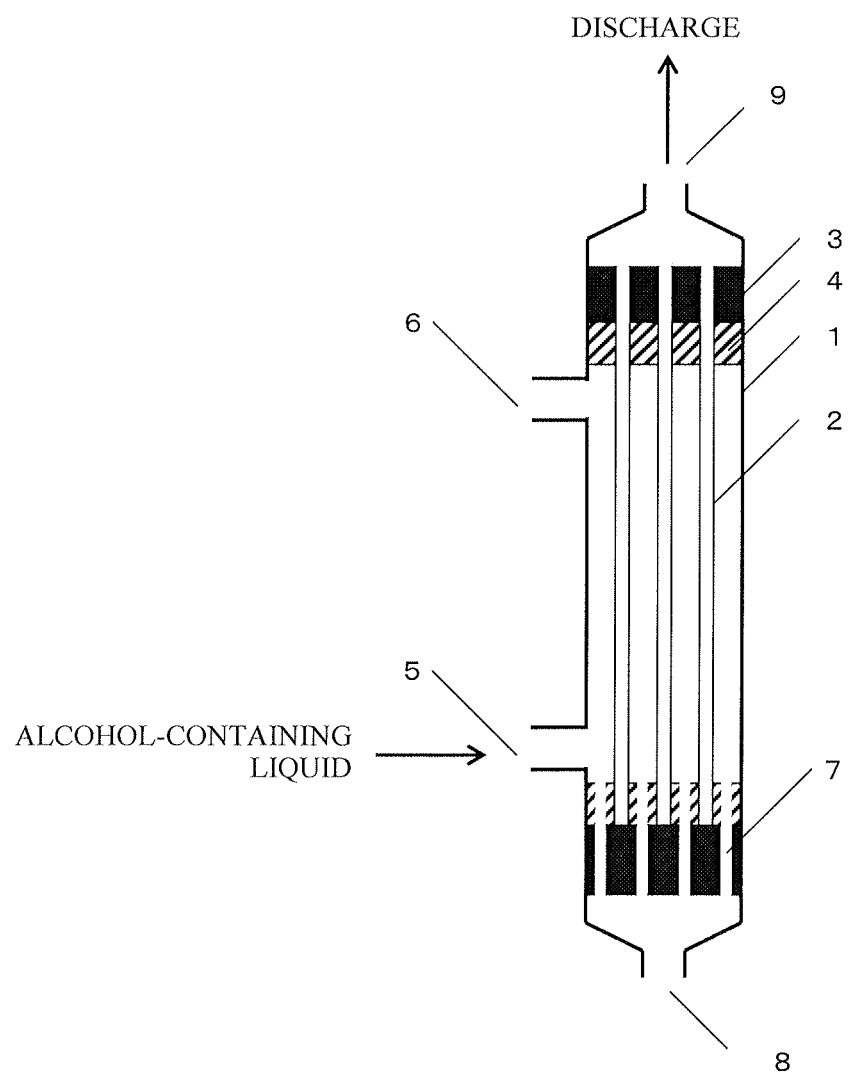

METHOD FOR HYDROPHILIZING HOLLOW-FIBER MEMBRANE MODULE

CROSS REFERENCE TO RELATED APPLICATIONS

This is the U.S. National Phase application of PCT International Application No. PCT/JP2012/075140, filed Sep. 28, 2012, and claims priority to Japanese Patent Application No. 2011-212113, filed Sep. 28, 2011, the disclosures of each of these applications being incorporated herein by reference in their entireties for all purposes.

FIELD OF THE INVENTION

The present invention relates to a method for hydrophilizing a hollow fiber membrane module, which is utilizable in various membrane separation processes.

BACKGROUND OF THE INVENTION

External-pressure type hollow fiber membrane modules which filtrates from the outside to the inside of the hollow fiber membranes have various merits including the simplicity of the seal structure which separates raw water which has not underdone membrane filtration from filtrate obtained after membrane filtration, ease of operation management, etc. However, the greatest feature thereof resides in that the module can have an exceedingly large filtration membrane area per unit volume of the module. Because of this, the membrane modules are being increasingly applied in recent years to water treatment processes for producing industrial water or tap water from river water, lake water, ground water, seawater, household wastewater, or industrial wastewater.

When raw water is membrane-filtrated using the membrane module, substances which are contained in the raw water and are to be removed, such as suspended substances and organic matters, accumulate on the outside of the membranes to cause a membrane clogging phenomenon. As a result, the filtration resistance of the membranes increases, shortly rendering the filtration impossible. Consequently, a general method for maintaining the membrane filtration performance is to periodically stop the membrane filtration and conduct physical cleaning. Usually, the filtration step and the physical cleaning step are automatically conducted repeatedly.

Examples of the physical cleaning include air scrubbing in which air is introduced into the lower part of the membrane module to oscillate the membranes in water to thereby shake off the suspended substances adherent to the outside of the membranes and back-pressure washing (backwashing) in which water (washing water) such as filtrate is forced into the membranes by pressure in the direction reverse to the filtration direction of the membrane module, i.e., from the hollow portion-side to the outside of the membranes, to remove the suspended substances adherent to the membranes, etc.

A hollow fiber membrane module has a configuration obtained by disposing a hollow fiber membrane bundle formed by bundling about hundreds to tens of thousands of hollow fiber membranes into a casing and fixing both ends of the bundle by casting a potting material. In the case of external-pressure type hollow fiber membrane modules, however, many modules have a structure in which the hollow fiber membranes are open at one end to enable filtrate to be obtained therethrough and have been sealed at the other end with a potting material. Well known as methods for the fixing by casting a potting material are a stationary method and a centrifugal method. The stationary method is a method in which a potting material is supplied with a constant delivery pump or the like from below the hollow fiber membrane bundle and the potting material is cured, while the centrifugal method is a method in which a potting material is moved to the ends of the casing by centrifugal force and cured. In either method, however, the casting resin creeps up along the outer surfaces of the membranes to a height of about several millimeters to several centimeters at the interface between the membranes and the potting material to form an uneven resin boundary. In the case where the hollow fiber membranes in such a state are oscillated during air scrubbing, local stress is imposed on the hollow fiber membranes at the uneven resin boundary, resulting in the concern of membrane rupture.

In order to prevent such a membrane rupture, a contrivance is being made in which after a hollow fiber membrane bundle has been fixed with a potting material for casting, a cushioning material such as a relatively flexible resin, e.g., a silicone resin, is cast again to form a cushioning layer between the potting material and the membrane interface, thereby preventing a membrane rupture from occurring at the uneven resin boundary.

In general, these membrane modules are fabricated from hollow fiber membranes which have been dried in order to facilitate handling and, thereafter, a hydrophilization treatment is conducted for expelling the air present in minute spaces in the pores of the membranes with a hydrophilizing agent such as an alcohol. This hydrophilization treatment is also performed in the case where the hollow fiber membranes have dried as a result of operation or storage. Specifically, known techniques for hydrophilizing an external-pressure type hollow fiber membrane module are a technique in which alcohol-containing liquid is caused to permeate from the outer surfaces of the hollow fiber membranes and the alcohol-containing liquid is taken out from the hollow portion-side, as shown in FIG. 8, and a technique in which alcohol-containing liquid is caused to permeate by pressurizing from the hollow portions of the hollow fiber membranes while keeping the inner and outer surfaces of the hollow fiber membranes in contact with the alcohol-containing liquid, as described in Patent Document 1.

PATENT DOCUMENT

Patent Document 1: JP-A-5-31336

SUMMARY OF THE INVENTION

The technique in which alcohol-containing liquid is caused to permeate from the outer surfaces of the hollow fiber membranes and the alcohol-containing liquid is taken out from the hollow portion-side, as shown in FIG. 8, has the following drawback. The alcohol-containing liquid is present inside of the hollow fiber membranes to which the alcohol-containing liquid has permeated, and a water head pressure corresponding to the height of the module is imposed on the hollow portions of the hollow fiber membranes located in the vicinity of the bonded/fixed portion in the lower part of the casing. Because of this, the membranes in that portion have a reduced pressure difference between the inside and the outside of the membranes and, as a result, the permeation flux of the alcohol-containing liquid is insufficient, rendering efficient hydrophilization impossible. In the case of Patent Document 1 also, since the alcohol-containing liquid is present in the spaces which are located on the outer-surface side of the hollow fiber membranes and to which the alcohol-containing liquid has permeated, a water head pressure corresponding to the height of the membrane module is imposed on the outside of the hollow fiber membranes located in the vicinity of the bonded/fixed portion in the lower part of the casing, resulting in a reduced pressure difference between the inside and the outside of the membranes in that portion. There is hence a problem that the hollow fiber membranes in the vicinity of the lower bonded/fixed portion cannot be efficiently hydrophilized.

Furthermore, in the case where the hollow fiber membrane module in which the bonded/fixed portion in the lower part of the casing includes a plurality of layers and the innermost layer thereof is formed of a silicone resin is hydrophilized, it is extremely difficult to hydrophilize the membranes while expelling the air present in the interstices formed between the silicone resin and the hollow fiber membranes.

Accordingly, the present invention aims to provide a method for hydrophilizing an external-pressure type hollow fiber membrane module, which is capable of efficiently hydrophilizing the hollow fiber membranes even in the vicinity of the bonded/fixed portion in the lower part of the casing.

The present invention includes the following exemplary configurations.

(1) A method for hydrophilizing a hollow fiber membrane module, the method including hydrophilizing an external-pressure type hollow fiber membrane module which includes a plurality of hollow fiber membranes and a casing having an upper nozzle and a lower nozzle respectively in upper and lower ends thereof and in which the hollow fiber membranes are bonded and fixed in an upper part of the casing with hollow portions of the hollow fiber membranes being open to form an upper bonded/fixed layer and are bonded and fixed to an inside of the casing in a lower part of the casing with the hollow portions being sealed to form a lower bonded/fixed layer, by introducing an alcohol-containing liquid from the upper nozzle, causing the alcohol-containing liquid to permeate the hollow fiber membranes from a hollow portion-side thereof to an outside thereof, and discharging the alcohol-containing liquid from the lower nozzle, in which a permeation rate of the alcohol-containing liquid is controlled so that an air layer is formed in a space between the casing and the outside of the hollow fiber membranes.

(2) A method for hydrophilizing a hollow fiber membrane module, the method including hydrophilizing an external-pressure type hollow fiber membrane module which includes a plurality of hollow fiber membranes and a casing having an upper nozzle and a lower nozzle respectively in upper and lower ends thereof and further having a lower side nozzle on a lower side surface thereof and in which the hollow fiber membranes are bonded and fixed in an upper part of the casing with hollow portions of the hollow fiber membranes being open to form an upper bonded/fixed layer and are bonded and fixed to an inside of the casing in a lower part of the casing with the hollow portions being sealed to form a lower bonded/fixed layer, by introducing an alcohol-containing liquid from the upper nozzle, causing the alcohol-containing liquid to permeate the hollow fiber membranes from a hollow portion-side thereof to an outside thereof, and discharging the alcohol-containing liquid from the lower side nozzle, in which a permeation rate of the alcohol-containing liquid is controlled so that an air layer is formed in a space between the casing and the outside of the hollow fiber membranes.

(3) The method for hydrophilizing a hollow fiber membrane module according to (1) or (2), in which the permeation rate of the alcohol-containing liquid is controlled so that the air layer is formed over a range of ⅔ or more of the space between the casing and the outside of the hollow fiber membranes.

(4) The method for hydrophilizing a hollow fiber membrane module according to any one of (1) to (3), in which the permeation rate of the alcohol-containing liquid is controlled so that the alcohol-containing liquid has a linear velocity of 0.6 m/s or less at the lower nozzle or the lower side nozzle.

(5) The method for hydrophilizing a hollow fiber membrane module according to any one of (1) to (4), in which the bonded/fixed layer in the lower part of the casing includes a plurality of layers, and an uppermost layer thereof includes a silicone resin.

According to the hydrophilization method described herein, the outer surfaces of the hollow fiber membranes in the lower part of the casing are prevented from receiving a water head pressure corresponding to the height of the membrane module and the hollow fiber membranes located in the vicinity of the lower bonded/fixed portion can be efficiently hydrophilized.

BRIEF DESCRIPTION OF THE DRAWINGS

FIG. 8 is a diagrammatic view showing one example of conventional techniques.

DETAILED DESCRIPTION OF EMBODIMENTS OF THE INVENTION

Figure 1:
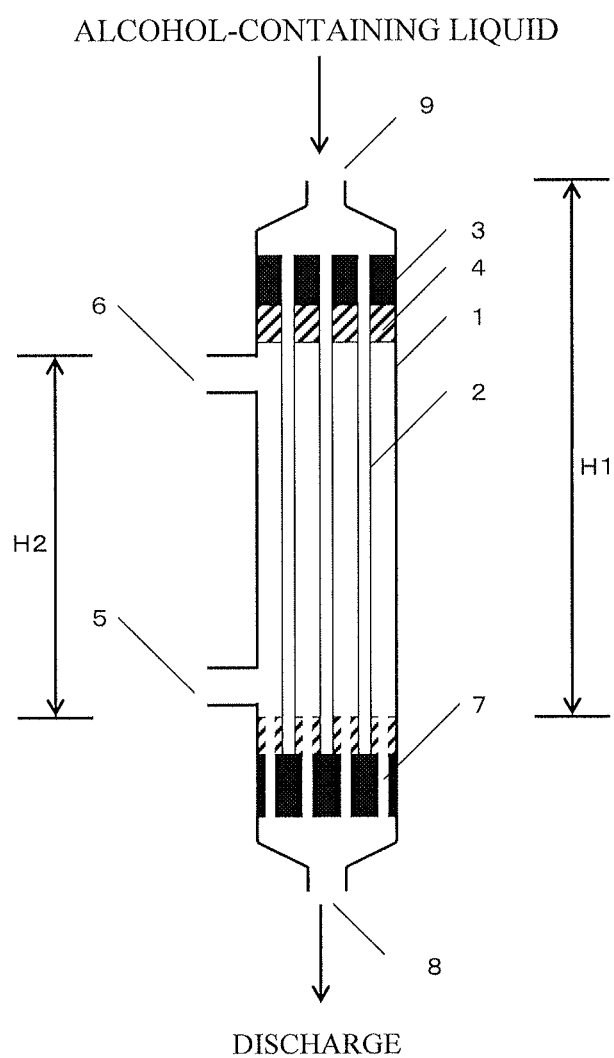
FIG. 1 is a diagrammatic vertical cross-sectional view showing one example of hollow fiber membrane modules according to the invention.

One example of hollow fiber membrane modules to which the invention is applied is explained below while referring to FIG. 1.

In a hollow fiber membrane module according to an embodiment of the invention, a plurality of hollow fiber membranes 2 are inserted into a casing 1 and the hollow fiber membranes 2 are bonded and fixed at both ends of the casing 1. Each bonded/fixed portion is fixed by casting a potting material 3, and a cushioning material 4 having flexibility is disposed on the inner side thereof. In the bonded/fixed portion in the upper part of the membrane module, the hollow portions of the hollow fiber membranes 2 are open, and filtrate can be obtained through an upper nozzle 9. A lower side nozzle 5 and an upper side nozzle 6 are disposed inside the bonded/fixed portions located at both ends of the casing 1. When this module is operated for filtration, the lower side nozzle 5 is used as a raw water feed port and the upper side nozzle 6 is used as a raw water discharge port. Furthermore, since a lower nozzle 8 is used as a feed port for air and raw water, through holes 7 are provided in the bonded/fixed portion located in the lower part of the casing (hereinafter referred to as sealed side).

The material of the casing to be used in the invention is not particularly limited, and examples thereof include vessels made of resins such as PVC resins, ABS resins, polypropylene resins, and polycarbonate resins, vessels made of fiber-reinforced resins obtained by reinforcing epoxy resins, urethane resins, or the like with reinforcing fibers such as glass fibers or carbon fibers, and vessels made of metals such as stainless steel.

The material of the hollow fiber membranes is not particularly limited, and examples thereof include polysulfones, polyethersulfones, polyacrylonitrile, polyimides, polyetherimides, polyamides, polyetherketones, polyetheretherketones, polyethylene, polypropylene, ethylene/vinyl alcohol copolymers, cellulose, cellulose acetate, poly(vinylidene fluoride), ethylene/tetrafluoroethylene copolymers, polytetrafluoroethylene, and composite materials thereof. Of these, poly(vinylidene fluoride) is preferred because poly(vinylidene fluoride) has excellent chemical resistance and, hence, periodical washing of the hollow fiber membranes with a chemical enables the hollow fiber membranes to recover the filtration function, leading to a prolongation of the life of the hollow fiber membrane module.

When such hollow fiber membranes are inserted into a vessel and bonded and fixed, it is preferred to dry the hollow fiber membranes beforehand because the dried hollow fiber membranes can be bonded without fail. However, excessive drying causes a decrease in performance or a deformation. Consequently, a method which can be advantageously used is to dry the hollow fiber membranes in the state of containing a humectant, such as glycerin or a surfactant. In a preferred method for drying hollow fiber membranes, the hollow fiber membranes are submerged for 10 minutes in an aqueous glycerin solution having a glycerin concentration of 10 to 50% by weight and are then dried for 12 hours or more in an atmosphere having a temperature of 25 to 40° C. and a relative humidity of 50 to 60%. In the case of handling hydrophobic membranes such as poly(vinylidene fluoride), use of a humectant is more preferred because the membranes can be prevented from excessively drying.

The potting material is not particularly limited so long as the material is a thermosetting resin which is liquid initially. However, since the potting material 3 is required to have the strength required for tube plates that separate the inside of the hollow fiber membranes from the outside thereof, it is preferred that the potting material 3 has a D hardness of 50 to 85. Incidentally, D hardness is a value measured after 10-second indentation with a type D durometer in accordance with JIS K 6253 (2006). Specific examples of the potting material include epoxy resins and polyurethane resins. Each bonded/fixed portion need not be a single layer constituted of one resin, and may be configured of a plurality of layers. Examples thereof include to use a cushioning material 4 constituted of a flexible resin as an uppermost layer on the sealed side for the purpose of preventing the hollow fiber membranes 2 from being damaged at the boundary of the potting material 3 having a high hardness.

It is preferred that the cushioning material 4 in this case has an A hardness of 20 to 60. Here, A hardness is a value measured after 10-second indentation with a type A durometer in accordance with JIS K 6253 (2006). Specific examples of the cushioning material include silicone resins and flexible polyurethanes. Poorly adhesive resins such as silicone resins are preferred of these. This is because in the case of using such a resin, the hollow fiber membranes do not adhere to the silicone resin to leave minute spaces therebetween and, hence, the hydrophilization method of the invention is highly effective. As this silicone resin, use can be made of a general silicone resin which is liquid initially, such as a two-pack type thermosetting silicone resin.

Next, an embodiment of the hydrophilization method of the invention is explained below while referring to FIG. 1 to FIG. 7.

Alcohol-containing water is introduced from the upper nozzle 9 of the hollow fiber membrane module shown in FIG. 1. The permeation rate of the alcohol-containing liquid is controlled so that an air layer is formed in the space between the casing 1 and the outside of the hollow fiber membranes 2, and the alcohol-containing liquid is discharged from the lower nozzle 8. Thus, the entire hollow fiber membranes including the portions thereof on the sealed side can be efficiently hydrophilized.

In the case where an air layer is not formed in the space between the casing 1 and the outside of the hollow fiber membranes 2, the alcohol-containing liquid has a reduced permeation flux in the lower part of the casing, making it difficult to efficiently hydrophilize the bonded/fixed portion located in the lower part of the casing.

Figure 2:
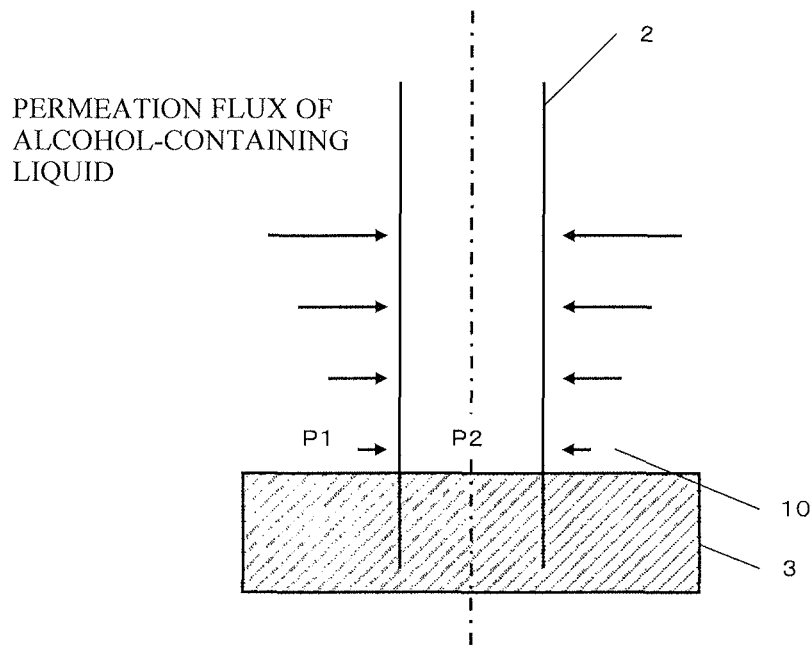
FIG. 2 is an enlarged schematic view showing one example of conventional techniques.

In a conventional method for hydrophilizing a hollow fiber membrane module, when alcohol-containing liquid is caused to permeate from the outer surfaces of the hollow fiber membranes to the hollow portion-side thereof, the alcohol-containing liquid is present both inside and outside the hollow fiber membranes. As a result, a water head pressure corresponding to the height H1 shown in FIG. 1 is added to the pressure P2 imposed on the inner surfaces of the hollow fiber membranes located in the lower part of the membrane module, and the difference between the pressure P2 and the pressure P1 imposed on the outer-surface side of the hollow fiber membranes becomes small, as shown in FIG. 2. Consequently, in the hollow fiber membranes located on the sealed side in the lower part of the membrane module, the permeation flux of the alcohol-containing liquid becomes small and the hollow fiber membranes cannot be efficiently hydrophilized. Incidentally, the pressure means gauge pressure.

Figure 3:
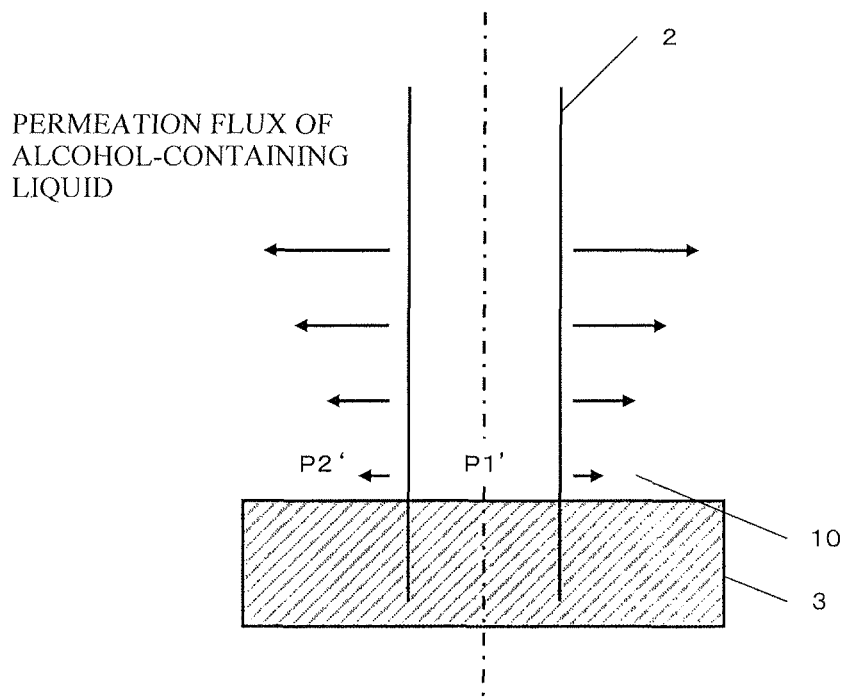
FIG. 3 is an enlarged schematic view showing another example of conventional techniques.

Also in the case of a conventional technique in which alcohol-containing liquid is introduced from the upper nozzle 9 shown in FIG. 1 and the alcohol-containing liquid is caused to permeate from the hollow portion-side to the outer surfaces of the hollow fiber membranes and then discharged from the upper side nozzle 6, the alcohol-containing liquid is present both inside and outside the hollow fiber membranes. As a result, a water head pressure corresponding to the height H2 shown in FIG. 1 is added to the pressure P2' imposed on the outer surfaces of the hollow fiber membranes located in the lower part of the membrane module, and the difference between the pressure P2' and the pressure P1' imposed on the hollow portion-side becomes small, as shown in FIG. 3. Consequently, in the hollow fiber membranes located on the sealed side in the lower part of the membrane module, the permeation flux of the alcohol-containing liquid becomes small and the hollow fiber membranes cannot be efficiently hydrophilized.

Figure 4:
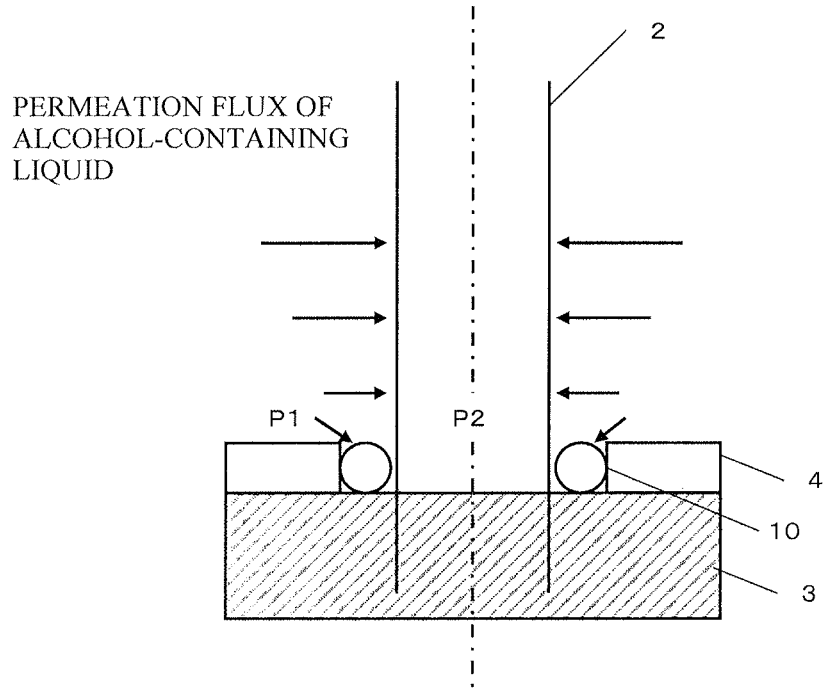
FIG. 4 is an enlarged schematic view showing still another example of conventional techniques.
Figure 5:
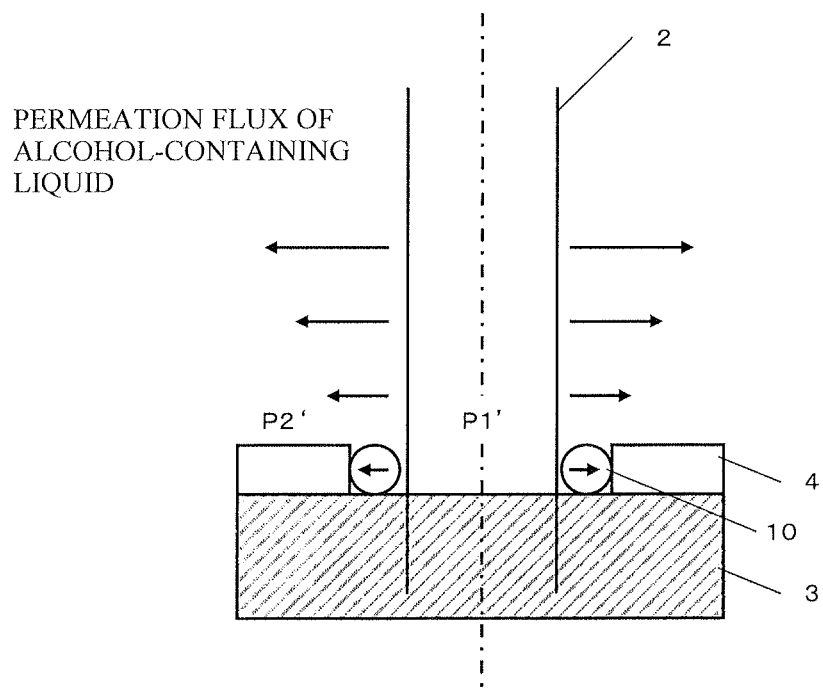
FIG. 5 is an enlarged schematic view showing a further example of conventional techniques.

Especially in the case where the bonded/fixed portion in the lower part of the casing is formed of a plurality of layers and the cushioning material 4 located as the uppermost layer thereof includes a silicone resin, as shown in FIG. 4 and FIG. 5, the alcohol-containing liquid can come only into the minute space between each hollow fiber membrane 2 and the cushioning material 4. Consequently, the alcohol-containing liquid has a reduced permeation flux, and it is exceedingly difficult to hydrophilize the hollow fiber membranes 2 while expelling the air 10 present in the space between each hollow fiber membrane 2 and the cushioning material 4.

As a method for forming a bonded/fixed portion including a plurality of layers, use can be made of a stationary method or a centrifugal method. The stationary method is a method in which a potting material is supplied with a constant delivery pump or the like from below the hollow fiber membrane bundle and the potting material is cured, while the centrifugal method is a method in which a potting material is moved to the ends of the casing by centrifugal force and cured.

As the cushioning material 4, use can be mainly made of a silicone resin, a flexible polyurethane, or the like as stated above. In the case where a silicone resin, which is a poorly adhesive resin, is used, it is difficult to bond the hollow fiber membranes 2 and the cushioning material 4 to each other even by the centrifugal method, which is capable of attaining higher adhesion than the stationary method by centrifugal force, and minute spaces remain therebetween.

Figure 6:
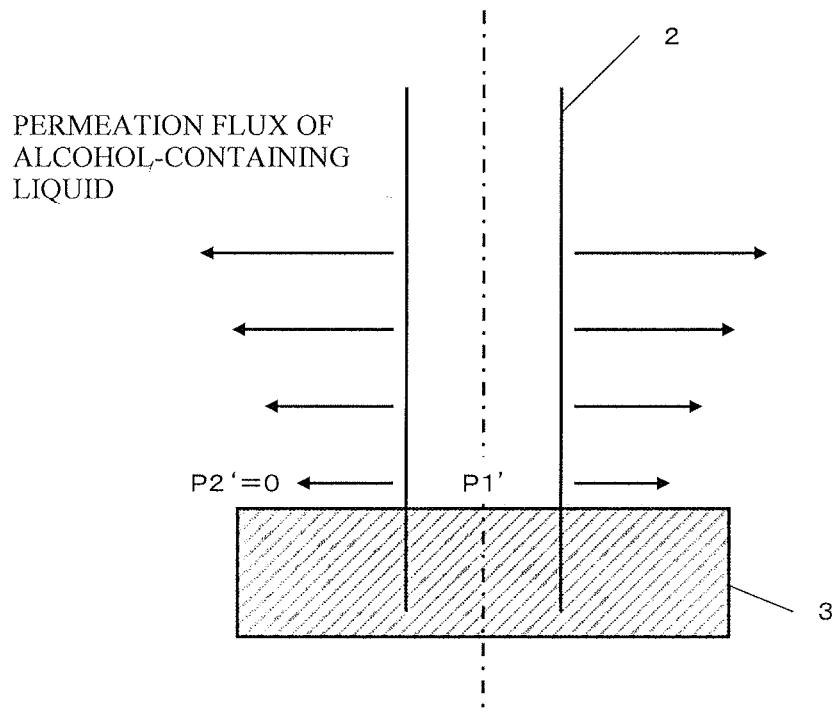
FIG. 6 is an enlarged schematic view showing one example of the effects of the invention.

In the method for hydrophilizing a hollow fiber membrane module of the invention, the permeation flux of the alcohol-containing liquid is preferably controlled so that an air layer is formed in the space outside the hollow fiber membranes within the casing and, hence, the pressure P2' imposed on the outer surfaces of the hollow fiber membranes can be reduced by the water head pressure corresponding to the capacity of the membrane module, as shown in FIG. 6. Consequently, the difference between the pressure P2' and the pressure P1' imposed on the hollow portion-side becomes larger and, hence, the permeation flux of the alcohol-containing liquid on the sealed side becomes larger, making it possible to efficiently hydrophilize the hollow fiber membranes as compared with the conventional technique.

It is more preferred to control the permeation rate of the alcohol-containing liquid so that an air layer is formed over a range of ⅔ or more of the space between the casing 1 and the outside of the hollow fiber membranes 2, because the water head pressure corresponding to the capacity of the membrane module can be further reduced.

Furthermore, the alcohol-containing liquid may be discharged from the lower side nozzle 5 which is in contact with the outer surfaces of the hollow fiber membranes, or from the lower nozzle 8 while controlling the flow rate thereof to 0.6 m/s or less in terms of linear velocity, so that the alcohol-containing liquid does not stagnate in the space outside the hollow fiber membranes within the casing. This method is more preferred because the water head pressure corresponding to the capacity of the membrane module can be reduced to substantially zero. Here, the linear velocity V [m/s] is defined as V=Q/S, in which Q [m³/s] is alcohol-containing liquid discharge rate and S [m²] is the cross-sectional area of the discharge port.

It is preferred that the linear velocity of the alcohol-containing liquid as measured at the discharge port for alcohol-containing liquid is 0.6 m/s or less. In the case where the linear velocity thereof at the discharge port for alcohol-containing liquid exceeds 0.6 m/s, it becomes difficult to discharge the alcohol-containing liquid from the discharge port for alcohol-containing water while preventing the alcohol-containing liquid from stagnating in the casing. The linear velocity at the upper nozzle 9 at the time when the alcohol-containing liquid flows in is not particularly limited. However, it is desirable that the linear velocity is 0.6 m/s or less so long as the cross-sectional area of the inlet is equal to the cross-sectional area of the discharge port. In the case where the linear velocity exceeds 0.6 m/s, it becomes difficult to discharge the alcohol-containing liquid from the discharge port for alcohol-containing liquid while preventing the alcohol-containing liquid from stagnating in the casing.

In the case where the cross-sectional area of the inlet is two times the cross-sectional area of the discharge port, it is desirable to regulate the linear velocity at the inlet to a half of the linear velocity at the discharge port, i.e., to 0.3 m/s or less. Conversely, in the case where the cross-sectional area of the inlet is half the cross-sectional area of the discharge port, it is desirable to regulate the linear velocity at the inlet to two times the linear velocity at the discharge port, i.e., to 1.2 m/s or less.

Figure 7:
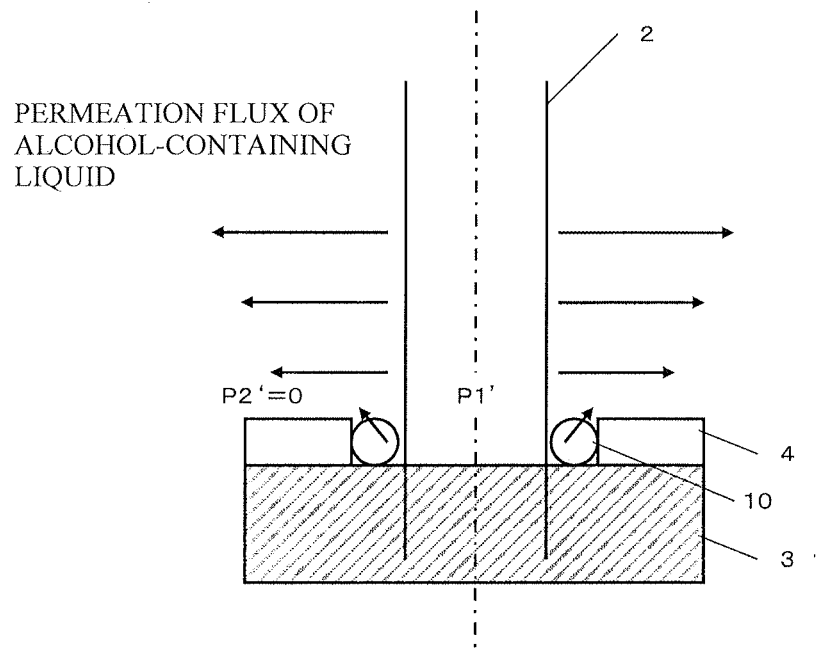
FIG. 7 is an enlarged schematic view showing another example of the effects of the invention.

Furthermore, in the case where the bonded/fixed portion in the lower part of the casing is formed of a plurality of layers and a cushioning material 4 is formed as an innermost layer thereof from a material which does not adhere to the hollow fiber membranes, the air can be efficiently expelled as compared with the conventional hydrophilization method shown in FIG. 5 because the permeation flux on the sealed side in the lower part of the membrane module is large as shown in FIG. 7. As a result, the entire hollow fiber membranes, including those in the lower part of the membrane module, can be hydrophilized.

It is preferred that the discharge port for alcohol-containing liquid in the invention is the lower nozzle 8. In the case where the alcohol-containing liquid is discharged from the lower side nozzle 5, the distance between the cushioning material 4 and the lower side nozzle 5 is important. Namely, in the cases when the distance between the cushioning material 4 and the lower side nozzle 5 is 20 cm, the alcohol-containing liquid stagnates in the module in an amount corresponding to the 20 cm and it is difficult to efficiently hydrophilize the hollow fiber membranes located in the lower part of the module. Consequently, in the case of discharging the alcohol-containing liquid from the lower side nozzle 5, it is preferred that the distance between the lower side nozzle 5 and the cushioning material 4 is 5 cm or less.

As the alcohol-containing liquid to be used in the invention, an aqueous solution of ethanol, methanol, isopropyl alcohol, or the like can be selected. By using such solutions, the hollow fiber membranes can be hydrophilized.

The hydrophilization method of the invention can be performed during module assembly and during operation. In general, when hydrophobic hollow fiber membranes are used to assemble a membrane module, the hollow fiber membranes are submerged in a humectant in order to improve the handleability of the hollow fiber membranes and are thereafter dried and subjected to potting and then to the hydrophilization treatment. It is also possible to perform the hydrophilization method of the invention also in the case where minute air bubbles have stagnated in the membrane pores during operation or the case where membranes which had once been hydrophilized were dried undesirably and minute air bubbles have stagnated in the membrane pores.

With respect to conditions for the hydrophilization treatment, it is possible to regulate the concentration and temperature of the alcohol-containing liquid, time period, and linear velocity. In the invention, however, it is preferred to use an aqueous solution having an ethanol concentration of 40 to 60%, which is easy to handle. With respect to temperature, it is desirable to conduct the treatment at a temperature in the range of usually 10 to 50° C., preferably 20 to 40° C. The hydrophilization period is not limited so long as the period is 1 hour or less, preferably 30 minutes or less.

EXAMPLES

The invention will be explained below in more detail by reference to Examples, but the invention should not be construed as being limited by the following Examples in any way.

Example 1

About 9,000 hollow fiber membranes made of poly(vinylidene fluoride) (inner diameter, 0.9 mm; outer diameter, 1.5 mm) which had a length of about 2,000 mm and which had been submerged for 10 minutes in an aqueous glycerin solution having a glycerin concentration of 30% by weight and then dried for 12 hours in an atmosphere having a temperature of 25° C. and a relative humidity of 50% were bundled and inserted into a casing made of poly(vinyl chloride) and having an inner diameter of about 200 mm. A urethane resin which attained a D hardness of 75 and had been formed using a modified polyisocyanate and a modified polyol as starting materials was cast to fix both ends of the bundle by a centrifugal method so as to result in a resin thickness of about 100 mm on each of the open side and the sealed side and in an effective membrane length of about 1,800 mm. Thus, the external-pressure type hollow fiber membrane module shown in FIG. 1 was produced.

A hydrophilization treatment was conducted for 30 minutes in which 20° C., 40% aqueous ethanol solution was introduced from the upper nozzle 9 of the module while controlling the flow rate thereof so as to form a 600-mm air layer within the module and the aqueous ethanol solution was discharged from the lower nozzle 8 which was in contact with the outer surfaces of the hollow fiber membranes. Thereafter, an air leak inspection was conducted in order to ascertain that the membrane module had been able to be hydrophilized. In the air leak inspection, the module was completely filled with water both on the raw-water side and on the filtrate side, 0.1-MPa compressed air was thereafter supplied from outside the hollow fiber membranes, and the hollow fiber membranes were visually examined as to whether bubbling from the openings thereof occurred or not. As a result of the air leak inspection, bubbling from two of the openings of the hollow fiber membranes was observed.

Example 2

The same hollow fiber membrane module as in Example 1 was produced and was hydrophilized in the same manner as in Example 1, except that the aqueous ethanol solution was introduced while controlling the flow rate thereof so as to form a 1,200-mm air layer within the module. This membrane module was subjected to the air leak inspection. As a result, bubbling from one of the openings of the hollow fiber membranes was observed.

Example 3

The same hollow fiber membrane module as in Example 1 was produced and was hydrophilized in the same manner as in Example 1, except that the aqueous ethanol solution was introduced at a linear velocity of 0.6 m/s so that the aqueous ethanol solution did not stagnate in the casing (during this introduction, an about 1,800-mm air layer was formed within the module). This membrane module was subjected to the air leak inspection. As a result, bubbling from the openings of the hollow fiber membranes was not observed, and it was ascertained that the entire hollow fiber membranes within the membrane module had been hydrophilized.

Example 4

The same hollow fiber membrane module as in Example 1 was produced and was hydrophilized in the same manner as in Example 1, except that the aqueous ethanol solution was introduced at a linear velocity of 0.3 m/s so that the aqueous ethanol solution did not stagnate in the casing (during this introduction, an about 1,800-mm air layer was formed within the module). This membrane module was subjected to the air leak inspection. As a result, bubbling from the openings of the hollow fiber membranes was not observed, and it was ascertained that the entire hollow fiber membranes within the membrane module had been hydrophilized.

Example 5

The same hollow fiber membrane module as in Example 1 was produced, except that a two-pack type thermosetting silicone resin which was liquid initially and had an A hardness of 40 was disposed by a centrifugal method in a resin thickness of about 30 mm on each of the opening side and the sealed side to thereby further form a cushioning layer on the inner side of each urethane resin, and that the thickness of the urethane resin was changed to about 70 mm. The membrane module was hydrophilized in the same manner as in Example 1. This membrane module was subjected to the air leak inspection and, as a result, bubbling from two of the openings of the hollow fiber membranes was observed.

Example 6

The same hollow fiber membrane module as in Example 5 was produced and was hydrophilized in the same manner as in Example 1, except that the aqueous ethanol solution was introduced while controlling the flow rate thereof so as to form a 1,200-mm air layer within the module. This membrane module was subjected to the air leak inspection. As a result, bubbling from one of the openings of the hollow fiber membranes was observed.

Example 7

The same hollow fiber membrane module as in Example 5 was produced and was hydrophilized in the same manner as in Example 1, except that the aqueous ethanol solution was introduced at a linear velocity of 0.6 m/s so that the aqueous ethanol solution did not stagnate in the casing. This membrane module was subjected to the air leak inspection. As a result, bubbling from the openings of the hollow fiber membranes was not observed, and it was ascertained that the entire hollow fiber membranes within the membrane module had been hydrophilized.

Example 8

The same hollow fiber membrane module as in Example 5 was produced and was hydrophilized in the same manner as in Example 1, except that the aqueous ethanol solution was introduced at a linear velocity of 0.3 m/s so that the aqueous ethanol solution did not stagnate in the casing. This membrane module was subjected to the air leak inspection. As a result, bubbling from the openings of the hollow fiber membranes was not observed, and it was ascertained that the entire hollow fiber membranes within the membrane module had been hydrophilized.

Example 9

The same hollow fiber membrane module as in Example 1 was produced and was hydrophilized in the same manner as in Example 1, except that the aqueous ethanol solution was discharged from the lower side nozzle 5. This membrane module was subjected to the air leak inspection. As a result, bubbling from two of the openings of the hollow fiber membranes was observed.

Comparative Example 1

The same hollow fiber membrane module as in Example 1 was produced, and hydrophilized by filling the inside and outside of the hollow fiber membranes within the membrane module with 20° C., 40% aqueous ethanol solution and pressurizing the aqueous ethanol solution with a pump for 30 minutes from the upper nozzle 9 to a pressure of 30 kPa and from the lower nozzle 8 to a pressure of 25 kPa. During this hydrophilization, the inside of the membrane module was filled with the aqueous ethanol solution and no air layer was formed. This membrane module was subjected to the air leak inspection. As a result, bubbling from six of the openings of the hollow fiber membranes was observed.

Comparative Example 2

The same hollow fiber membrane module as in Example 1 was produced and subjected to a 30-minute hydrophilization treatment in which the aqueous ethanol solution was introduced from the lower nozzle 8 which was in contact with the outer surfaces of the hollow fiber membranes, at a linear velocity of 0.6 m/s and discharged from the upper nozzle 9. During this hydrophilization treatment, the inside of the membrane module was filled with the aqueous ethanol solution and no air layer was formed. This membrane module was subjected to the air leak inspection. As a result, bubbling from eight of the openings of the hollow fiber membranes was observed.

Comparative Example 3

The same hollow fiber membrane module as in Example 1 was produced and was hydrophilized in the same manner as in Example 1, except that the aqueous ethanol solution was introduced at a linear velocity of 0.9 m/s. During this hydrophilization, the inside of the membrane module was filled with the aqueous ethanol solution and no air layer was formed. This membrane module was subjected to the air leak inspection. As a result, bubbling from six of the openings of the hollow fiber membranes was observed.

While the invention has been described in detail and with reference to specific embodiments thereof, it will be apparent to one skilled in the art that various changes and modifications can be made therein without departing from the spirit and scope thereof.

This application is based on Japanese Patent Application No. 2011-212113 filed on Sep. 28, 2011, the contents thereof being incorporated herein by reference.

DESCRIPTION OF REFERENCE NUMERALS AND SIGNS

1: Casing
2: Hollow fiber membrane
3: Potting material
4: Cushioning material
5: Lower side nozzle
6: Upper side nozzle
7: Through hole
8: Lower nozzle
9: Upper nozzle
10: Air

The invention claimed is:

1. A method for hydrophilizing a hollow fiber membrane module, the method comprising hydrophilizing an external-pressure type hollow fiber membrane module which comprises a plurality of hollow fiber membranes and a casing having an upper nozzle and a lower nozzle respectively in upper and lower ends thereof and in which the hollow fiber membranes are bonded and fixed in an upper part of the casing with hollow portions of the hollow fiber membranes being open to form an upper bonded/fixed layer and are bonded and fixed to an inside of the casing in a lower part of the casing with the hollow portions being sealed to form a lower bonded/fixed layer, by introducing an alcohol-containing liquid from the upper nozzle, causing the alcohol-containing liquid to permeate the hollow fiber membranes from a hollow portion-side thereof to an outside thereof, and discharging the alcohol-containing liquid from the lower nozzle,
   wherein a permeation rate of the alcohol-containing liquid is controlled so that an air layer is formed in a space between the casing and the outside of the hollow fiber membranes.

2. The method for hydrophilizing a hollow fiber membrane module according to claim 1, wherein the permeation rate of the alcohol-containing liquid is controlled so that the air layer is formed over a range of ⅔ or more of the space between the casing and the outside of the hollow fiber membranes.

3. The method for hydrophilizing a hollow fiber membrane module according to claim 1, wherein the permeation rate of the alcohol-containing liquid is controlled so that the alcohol-containing liquid has a linear velocity of 0.6 m/s or less at the lower nozzle or the lower side nozzle.

4. The method for hydrophilizing a hollow fiber membrane module according to claim 1, wherein the bonded/fixed layer in the lower part of the casing includes a plurality of layers, and an uppermost layer thereof comprises a silicone resin.

5. A method for hydrophilizing a hollow fiber membrane module, the method comprising hydrophilizing an external-pressure type hollow fiber membrane module which comprises a plurality of hollow fiber membranes and a casing having an upper nozzle and a lower nozzle respectively in upper and lower ends thereof and further having a lower side nozzle on a lower side surface thereof and in which the hollow fiber membranes are bonded and fixed in an upper part of the casing with hollow portions of the hollow fiber membranes being open to form an upper bonded/fixed layer and are bonded and fixed to an inside of the casing in a lower part of the casing with the hollow portions being sealed to form a lower bonded/fixed layer, by introducing an alcohol-containing liquid from the upper nozzle, causing the alcohol-containing liquid to permeate the hollow fiber membranes from a hollow portion-side thereof to an outside thereof, and discharging the alcohol-containing liquid from the lower side nozzle,
   wherein a permeation rate of the alcohol-containing liquid is controlled so that an air layer is formed in a space between the casing and the outside of the hollow fiber membranes.

6. The method for hydrophilizing a hollow fiber membrane module according to claim 5, wherein the permeation rate of the alcohol-containing liquid is controlled so that the air layer is formed over a range of ⅔ or more of the space between the casing and the outside of the hollow fiber membranes.

7. The method for hydrophilizing a hollow fiber membrane module according to claim 5, wherein the permeation rate of the alcohol-containing liquid is controlled so that the alcohol-containing liquid has a linear velocity of 0.6 m/s or less at the lower nozzle or the lower side nozzle.

8. The method for hydrophilizing a hollow fiber membrane module according to claim 5, wherein the bonded/fixed layer in the lower part of the casing includes a plurality of layers, and an uppermost layer thereof comprises a silicone resin.

* * * * *